(12) United States Patent
Wright et al.

(10) Patent No.: US 9,593,760 B2
(45) Date of Patent: Mar. 14, 2017

(54) REVERSE IDLER SUPPORT

(71) Applicant: Eaton Corporation, Cleveland, OH (US)

(72) Inventors: Judith Wright, Southfield, MI (US); Robert Craft, Southfield, MI (US); Terry Teeter, Southfield, MI (US)

(73) Assignee: Eaton Corporation, Cleveland, OH (US)

( * ) Notice: Subject to any disclaimer, the term of this patent is extended or adjusted under 35 U.S.C. 154(b) by 427 days.

(21) Appl. No.: 14/106,297

(22) Filed: Dec. 13, 2013

(65) Prior Publication Data

US 2014/0190296 A1  Jul. 10, 2014

Related U.S. Application Data

(60) Provisional application No. 61/737,960, filed on Dec. 17, 2012.

(51) Int. Cl.
*F16H 57/021* (2012.01)
*F16H 57/022* (2012.01)
*F16H 3/08* (2006.01)

(52) U.S. Cl.
CPC ......... *F16H 57/021* (2013.01); *F16H 57/022* (2013.01); *F16H 2003/0822* (2013.01); *F16H 2057/0224* (2013.01); *Y10T 74/19565* (2015.01)

(58) Field of Classification Search
CPC . F16B 7/14; B25B 11/00; B23Q 3/106; Y10T 403/32467

USPC ............................................... 74/467, 606 R
See application file for complete search history.

(56) References Cited

U.S. PATENT DOCUMENTS

| | | | | | |
|---|---|---|---|---|---|
| 4,766,773 | A | * | 8/1988 | Yamaguchi | F16H 3/0915 184/6.12 |
| 5,054,079 | A | * | 10/1991 | Frielingsdorf | H04R 1/46 379/430 |
| 5,505,102 | A | * | 4/1996 | Craft | F16H 57/021 74/331 |
| 5,795,259 | A | * | 8/1998 | Stoliker | F16H 15/12 476/33 |
| 6,269,702 | B1 | * | 8/2001 | Lambson | G01L 3/108 73/862.045 |
| 2004/0206198 | A1 | * | 10/2004 | Coxon | F16H 57/0434 74/467 |
| 2008/0245172 | A1 | * | 10/2008 | Kiyosawa | F16H 49/001 74/467 |

* cited by examiner

*Primary Examiner* — Victor MacArthur
(74) *Attorney, Agent, or Firm* — Fishman Stewart PLLC (57) ABSTRACT

A reverse idler support article includes a reverse idler support body that has a disk member, a plateau and a hollow cylinder. The disk member is connected to and in facial contact with the plateau that projects from a first disk member surface and the hollow cylinder that projects from a second disk member surface to define an interior space. The disk member and the plateau have an offset hole formed therethrough that is in communication with the interior space. The offset hole is oriented offset from a central axis of the reverse idler support body which extends generally centrally through the disk member and the interior space of the hollow cylinder.

20 Claims, 10 Drawing Sheets

REVERSE IDLER SUPPORT

RELATED APPLICATIONS

The present application claims priority to U.S. Provisional Application No. 61/737,960, filed on Dec. 17, 2012, the contents of which are incorporated herein in their entirety.

FIELD

The present invention relates to a reverse idler support article. More particularly, the present invention is directed to a reverse idler support article for supporting a reverse idler shaft having a reverse idler gear rotatably mounted thereon inside a transmission.

BACKGROUND

Transmissions are usually incorporated into the drivetrain of vehicles powered by internal combustion engines. A transmission enables a driver of a vehicle to optimize the power of the engine with the forward speed of the vehicle. There are a variety of transmission types such as an automatic transmission, a manual transmission and a semi-automatic transmission; moreover, transmissions are typically categorized by the number of forward gear ratios such as a four-speed transmission, a five-speed transmission and even an eight-speed transmission found in modern passenger vehicles. Typically, even more gear ratios may be found in transmissions serving specialized purposes such as those found in so-called heavy duty trucks. Regardless of the type and category of the transmission, the driver of the vehicle is sometimes required to drive the vehicle in a reverse direction. To achieve a reverse direction, a reverse idler gear assembly is installed into a transmission housing of the transmission.

The reverse idler gear assembly includes a reverse idler shaft with a reverse idler gear rotatably mounted thereon. The reverse idler shaft is relatively short in length. Since the reverse idler shaft must be supported on both ends, challenges may be presented to the design engineer to adequately support the reverse idler gear assembly within the transmission housing.

SUMMARY

A reverse idler support article may include a reverse idler support body that has a disk member, a plateau and a hollow cylinder. The disk member may be connected to and placed in facial contact with the plateau that projects from a first disk member surface and the hollow cylinder that projects from a second disk member surface to define an interior space. The disk member and the plateau have an offset hole formed therethrough that is in communication with the interior space. The offset hole may be oriented offset from a central axis of the reverse idler support body, which extends generally centrally through the disk member and the interior space of the hollow cylinder.

Advantages of the present invention will be better appreciated in view of the detailed description of the exemplary embodiments of the present invention with reference to the accompanying drawings

BRIEF DESCRIPTION OF THE DRAWINGS

Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

Hereinafter, exemplary illustrations will be described with reference to the attached drawings. The structural components common to those known by artisans in the applicable art and the structural components common to respective illustrative embodiments may be represented by the same symbols and repeated description thereof may be omitted.

A first exemplary illustration of a reverse idler support article 10 is hereinafter described with reference to FIGS. 1-9. As shown in FIGS. 1-9, the reverse idler support article 10 has a reverse idler support body (also 10) and includes a disk member 12, a plateau 14 and a hollow cylinder 16. The disk member 12 is connected to and may be brought into facial contact with the plateau 14 projecting from a first disk member surface thereof 12a and the hollow cylinder 16 projecting from a second disk member surface 12b thereof to define an interior space 18. By way of example only and not by way of limitation, the disk member 12, the plateau 14 and the hollow cylinder 16 may be connected to each other by any conventional means such as by an adhesive, welding or mechanical fasteners. As discussed and illustrated herein below, the disk member 12, the plateau 14 and the hollow cylinder 16 may also be fabricated as an integral construction.

Figure 1:
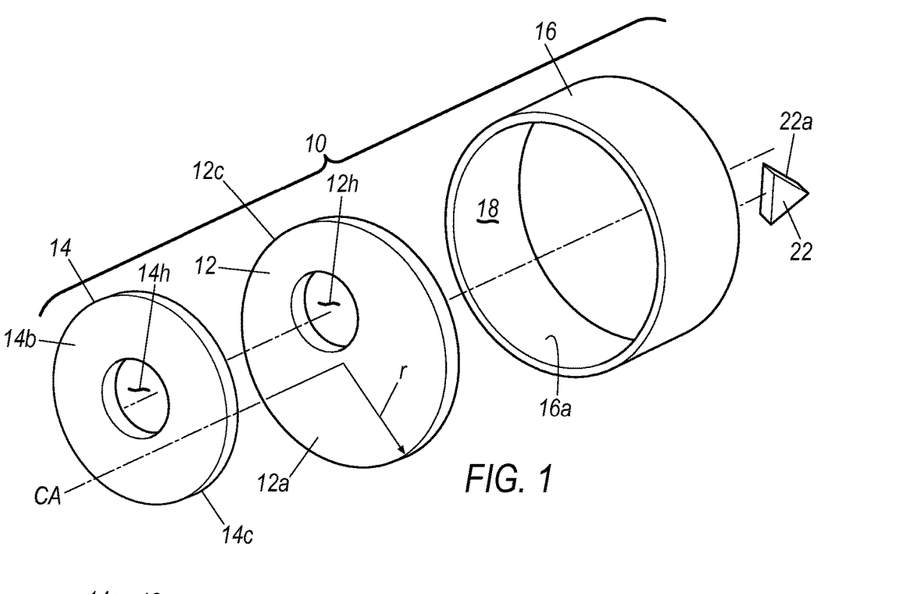
FIG. 1 is an exploded perspective view of a first exemplary embodiment of a reverse idler support article.
Figure 2:
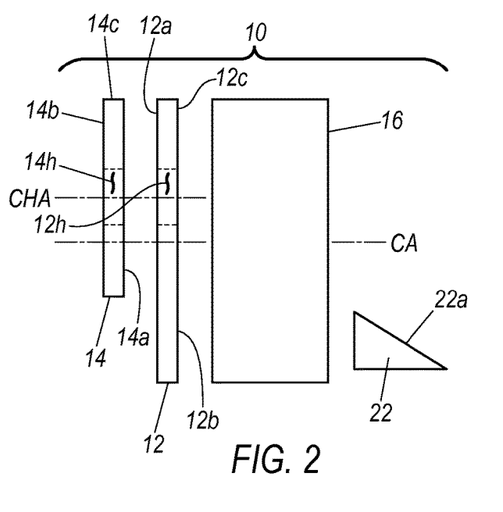
FIG. 2 is an exploded side elevation view of the first exemplary embodiment of the reverse idler support article.

With reference to FIG. 1, the disk member 12 extends radially (arrow r) from and about a central axis CA and terminates at a disk member peripheral end portion 12c. As best shown in FIG. 2, by example only and not by way of limitation, the first disk member surface 12a and the second disk member surface 12b are essentially planar or flat, are disposed opposite to one another and are configured to extend parallel to one another. Illustrated in FIGS. 1-4, a disk member hole 12h extends through and between the first disk member surface 12a and the second disk member surface 12b. As reflected in FIGS. 1-9, the disk member hole 12h is positioned offset from the central axis CA. With reference to FIGS. 4 and 5, the disk member hole 12h has a disk member hole diameter DD.

Figure 3:
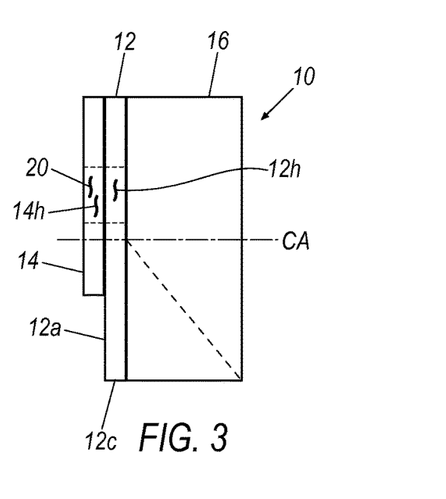
FIG. 3 is a side elevation view of the first exemplary embodiment of the reverse idler support article as assembled.
Figure 4:
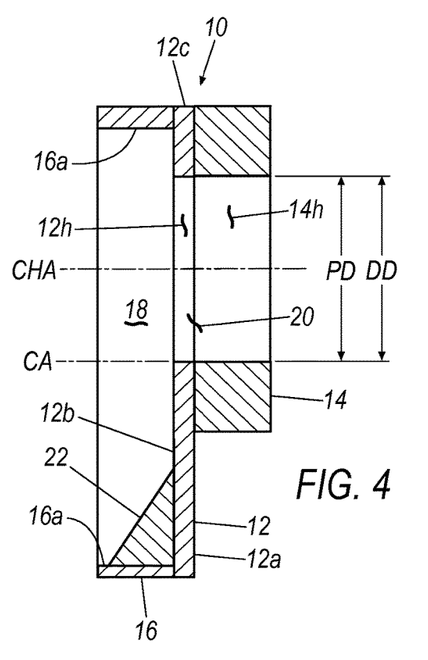
FIG. 4 is a cross-sectional view of the first exemplary embodiment of the reverse idler support article.
Figure 5:
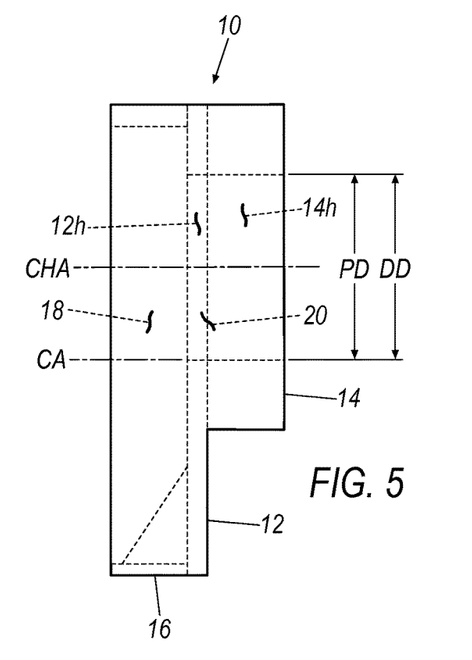
FIG. 5 is an enlarged side elevation view of the first exemplary embodiment of the reverse idler support article.
Figure 6:
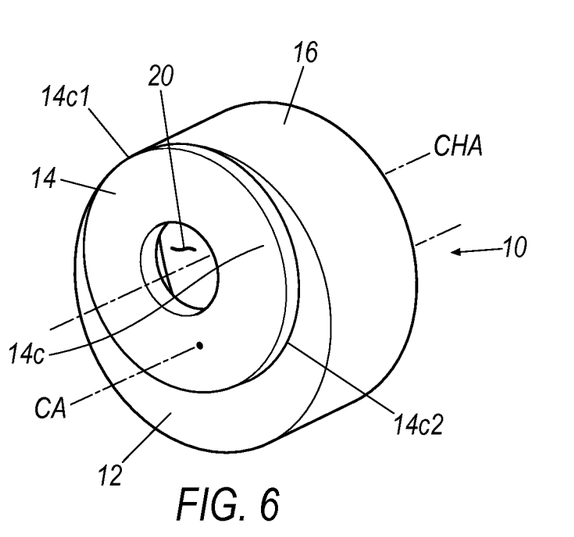
FIG. 6 is a front perspective view of the first exemplary embodiment of the reverse idler support article.

In FIGS. 1-5, the plateau 14 has a first plateau surface 14a and a second plateau surface 14b that is disposed opposite the first plateau surface 14a. By example only and not by way of limitation, the first plateau surface 14a and the second plateau surface 14b are essentially planar or flat and extend parallel to each other. As shown in FIGS. 1-5, the plateau 14 includes a plateau hole 14h. FIGS. 4 and 5 show that the plateau hole 14h has a plateau diameter PD that may be equal to the disk member hole diameter DD. The plateau hole 14h extends through and between the first plateau surface 14a and the second plateau surface 14b, as best shown in FIG. 2. With reference to FIGS. 2 and 3, the plateau 14 is connected to the first disk member surface 12a in a manner such that the first disk member surface 12a and the first plateau surface 14a are in facial contact with each other. In FIGS. 2-5, the disk member hole 12h and the plateau hole 14h are axially aligned with one another along a common hole axis CHA, which forms a combined hole that will have a uniform diameter if the two holes have a common diameter, extending along and about the common hole axis CHA. The combined hole, i.e., the disk member hole 12h and the plateau hole 14h, is hereinafter referred to as "an offset hole 20" and the common hole axis CHA is also referred to herein as "an offset hole axis" CHA.

With reference to FIGS. 2 and 3, the hollow cylinder 16 is connected to the second disk member surface 12b at the disk member peripheral end portion 12c and, as such, the hollow cylinder 16 projects from the disk member 12 to form "a hub" configuration. As illustrated in FIGS. 1, 4, 7 and 9, the hollow cylinder 16 has an interior circumferential surface 16a that extends about the central axis CA to define the interior space 18 along with the second disk member surface 12b. As best shown in FIGS. 4 and 5, the interior space 18 and the offset hole 20 are in communication with each other.

As best shown in FIGS. 6-9, the offset hole 20 is positioned offset from the central axis CA and extends through the disk member 12 and the plateau 14 to the interior space 18. More particularly, the central axis CA and the common hole axis CHA that extend parallel to each other are disposed apart from one another. Although not by way of limitation but by example only, the central axis CA is illustrated as extending through both the disk member 12 and the plateau 14. However, one of ordinary skill in the art would appreciate that the central axis CA might extend through the offset hole 20. Thus, as long as the central axis CA and the common hole axis CHA are not coexistent with each other, the present disclosure encompasses any arrangement where the central axis CA and the common hole axis CHA are disposed apart from one another at a distance greater than zero.

Figure 7:
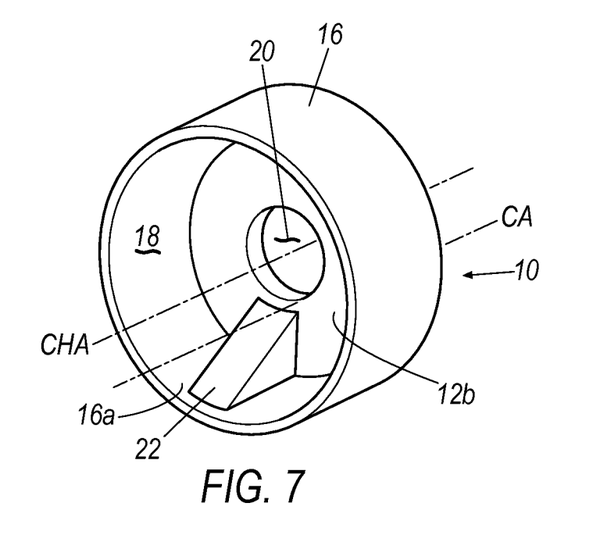
FIG. 7 is a rear perspective view of the first exemplary embodiment of the reverse idler support article.
Figure 9:
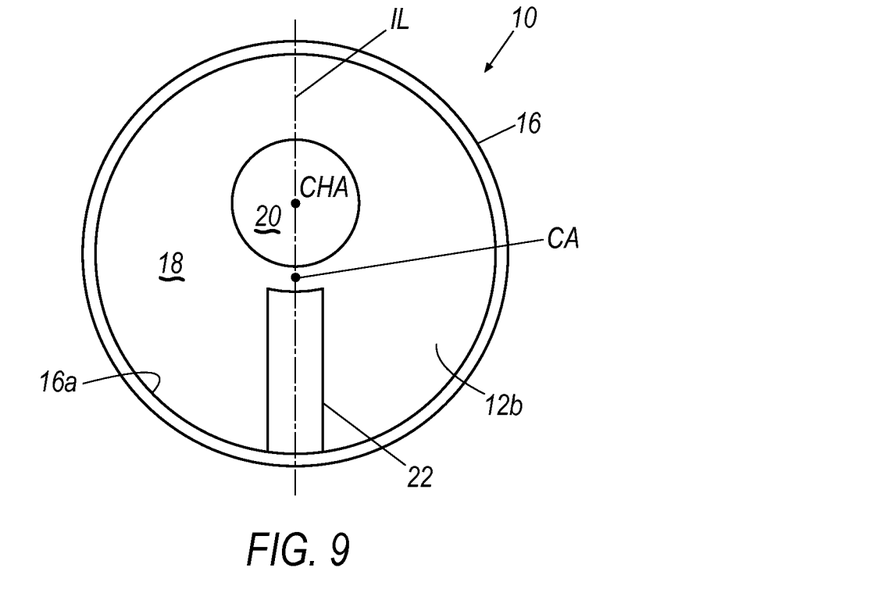
FIG. 9 is a rear elevation view of the first exemplary embodiment of the reverse idler support article.
Figure 10:
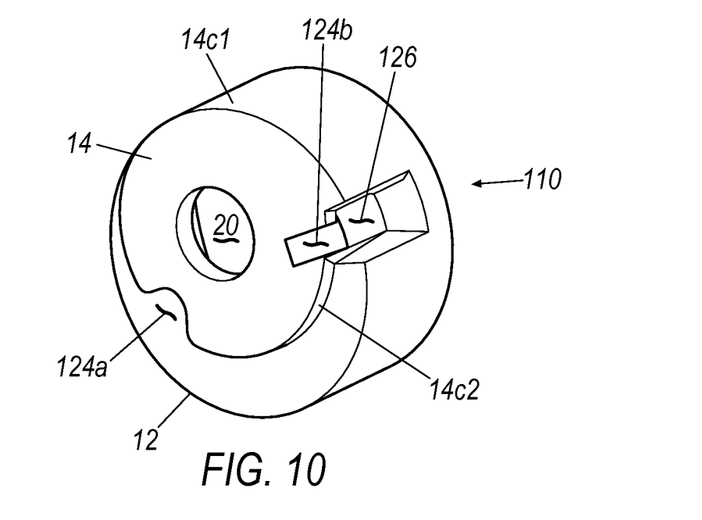
FIG. 10 is a front perspective view of a second exemplary embodiment of the reverse idler support article.

With reference to FIGS. 1, 2, 4, 7 and 9, the reverse idler support article 10 of the first illustrative embodiment of the invention includes a rib member 22. The rib member 22 is disposed in the interior space 18 and is connected to both the second disk member surface 12b and the interior circumferential surface 16a of the hollow cylinder 16. As best shown in FIGS. 1 and 2, the rib member 22 may be triangularly shaped, thereby forming a ramp 22a. As shown in FIGS. 4, 7 and 9, the ramp 22a extends to and between the second disk member surface 12b and the interior circumferential surface 16a of the hollow cylinder 16. By way of example only and not by way of limitation, the ramp 22a, as illustrated best in FIG. 9, is oriented within the interior space 18 to rectilinearly align along an imaginary straight line IL with the central axis CA and the common hole axis CHA.

Figure 8:
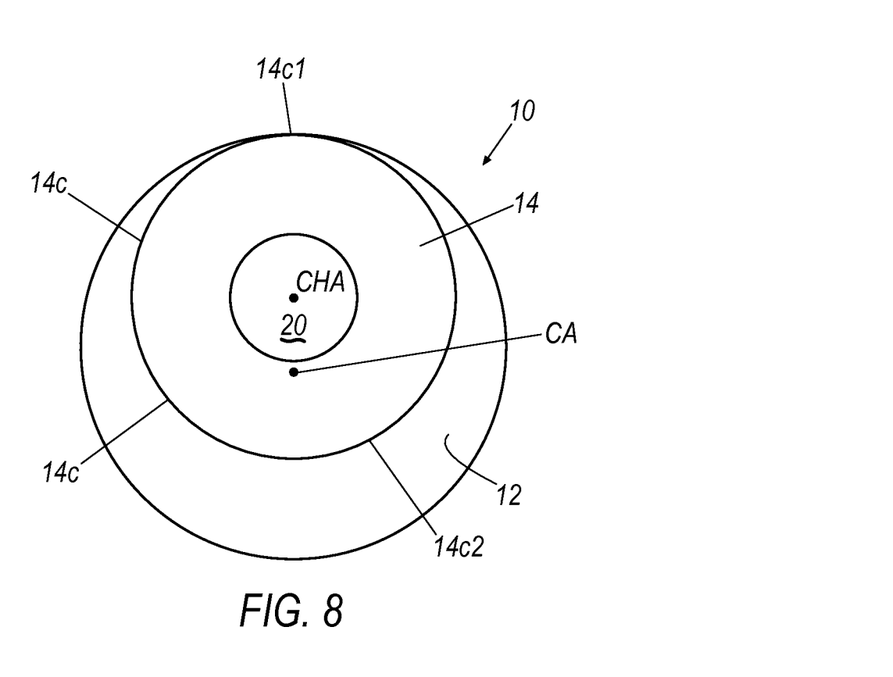
FIG. 8 is a front elevation view of the first exemplary embodiment of the reverse idler support article.

With reference to FIGS. 1-9, the disk member 12 and the plateau 14 are configured differently in size but retain the same shape. As discussed in more detail below, the disk member 12 and the plateau 14 can also be configured differently in shape. The disk member 12 defines a disk member size, for instance, in area or area configuration, and the plateau 14 defines a plateau size, likewise in area or area configuration. The plateau size is smaller than the disk member size. As shown in FIGS. 1, 2, 6 and 8, the plateau 14 includes a plateau peripheral end portion 14c that extends circumferentially about the plateau 14. In turn, the plateau peripheral end portion 14c has a first plateau peripheral end portion segment 14c1 and a second plateau peripheral end portion segment 14c2 that are connected to each other in a continuous loop. As best shown in FIG. 8, the first plateau peripheral end portion segment 14c1 is configured to coincide with a segment of the disk member peripheral end portion 12c. In other words, the first plateau peripheral end portion segment 14c1 and the segment of the disk member peripheral end portion 12c combine together to form a smooth, continuous, arcuate sidewall section while the second plateau peripheral end portion segment 14c2 forms a step-down landing with the first disk member surface 12a of the disk member 12. Also, the offset hole 20 is disposed between the central axis CA and the first plateau peripheral end portion segment 14c1.

A second exemplary embodiment of a reverse idler support article 110 of the present invention is illustrated in FIGS. 10-16. The second exemplary embodiment of the reverse idler support article 110 is formed as an integral construction using, for example, conventional machining techniques or conventional molding techniques. The second exemplary embodiment of the reverse idler support article 110 is similar to the first exemplary embodiment of the reverse idler support article 10.

As best shown in FIGS. 10, 12, 14 and 15, the second plateau peripheral end portion segment 14c2 includes a first notch 124a and a second notch 124b. The first notch 124a extends inwardly towards the offset hole axis CHA. As viewed in elevation in FIG. 12, the first notch 124a is generally semi-circular in shape with rounded distal ends. The second notch 124b extends through the plateau 14 and the disk member 12 to terminate in a passageway 126. The passageway 126 enables fluid communication exteriorly of the reverse idler support article 110 and the interior space 18.

Figure 11:
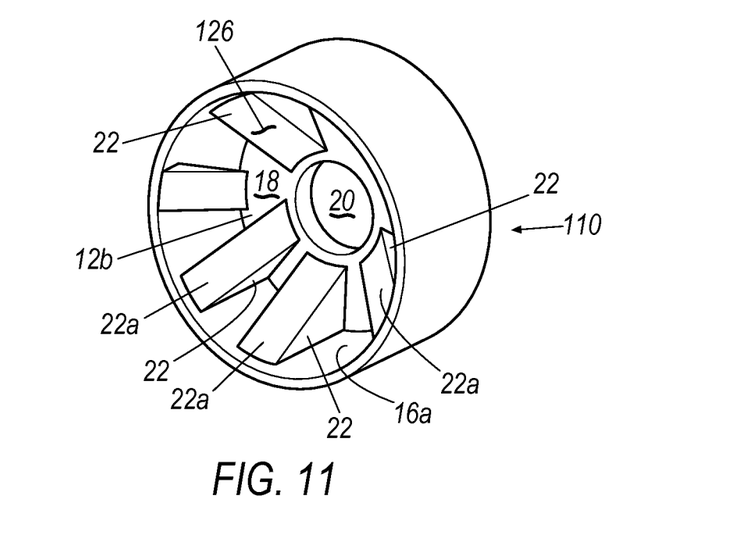
FIG. 11 is a rear perspective view of the second exemplary embodiment of the reverse idler support article.
Figure 12:
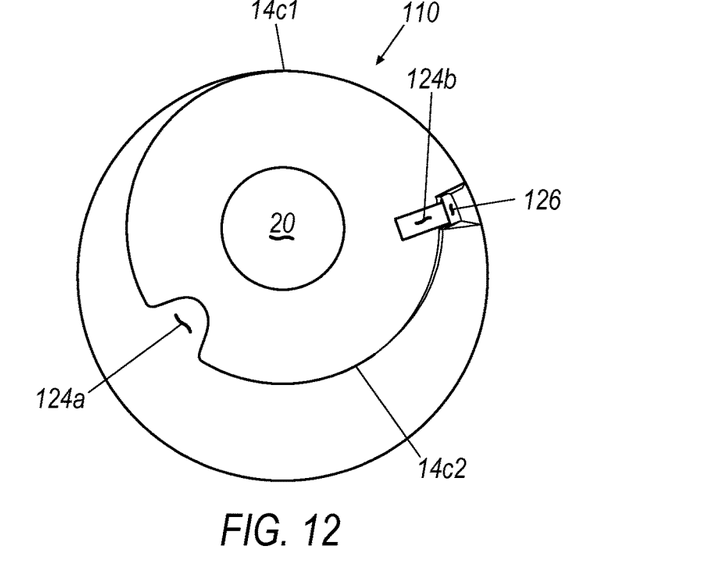
FIG. 12 is a front elevation view of the second exemplary embodiment of the reverse idler support article.
Figure 13:
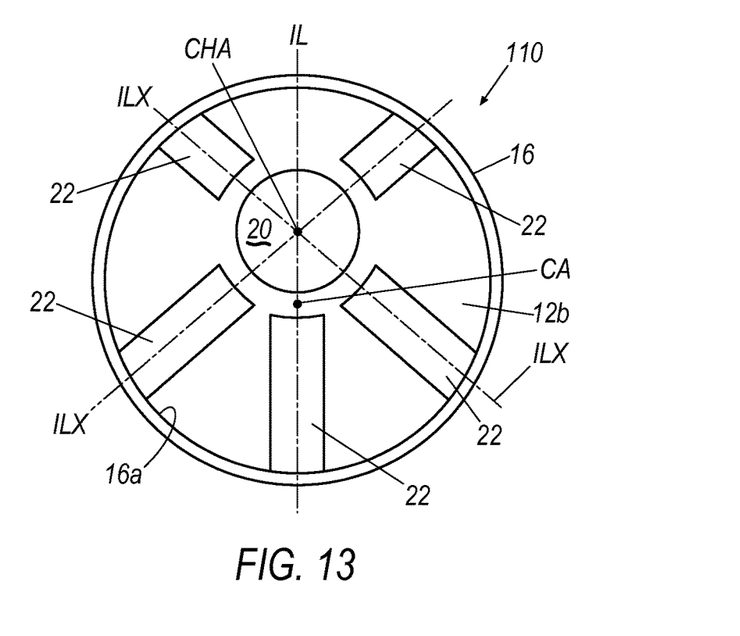
FIG. 13 is a rear elevation view of the second exemplary embodiment of the reverse idler support article.
Figure 14:
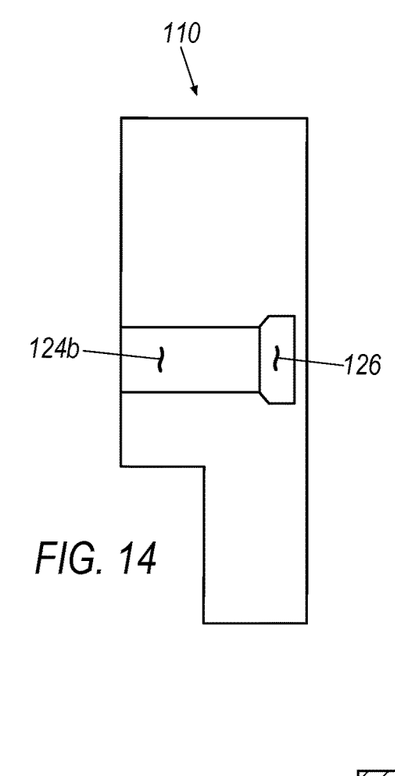
FIG. 14 is a right-side elevation view of the second exemplary embodiment of the reverse idler support article.
Figure 15:
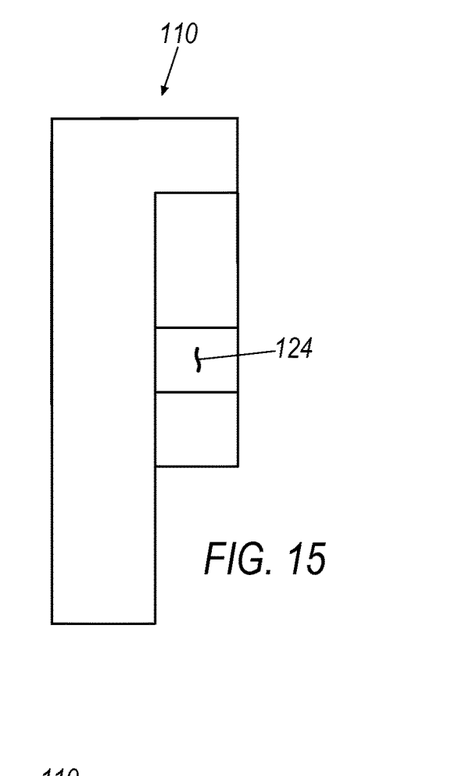
FIG. 15 is a left-side elevation view of the second exemplary embodiment of the reverse idler support article.
Figure 16:
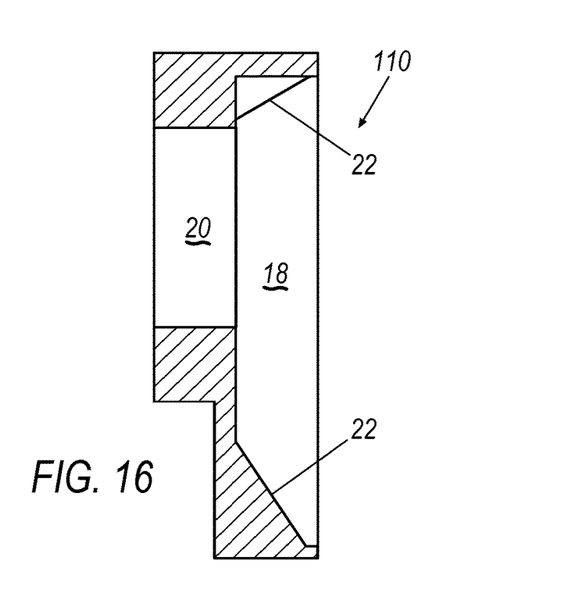
FIG. 16 is a cross-sectional view of the second exemplary embodiment of the reverse idler support article.

Furthermore, as shown in FIGS. 11 and 13, the reverse idler support article 110 includes a plurality of rib members 22 disposed in the interior space 18. As suggested hereinabove, each one of the plurality of rib members 22 is connected to the second disk member surface 12b and the interior circumferential surface 16a of the hollow cylinder 16 and are triangularly shaped to form ramps 22a that extend to and between the second disk member surface 12b and the interior circumferential surface 16a of the hollow cylinder 16. Note that one ramp 22a of one of the plurality of rib members 22 is oriented within the interior space 18 to rectilinearly align with the central axis CA and the offset hole axis CHA as shown in FIG. 13. However, one of ordinary skill in the art would appreciate that it is not necessary, required or critical that the one ramp 22a of one of the plurality of rib members 22 is oriented within the interior space 18 to rectilinearly align with both the central axis CA and the offset hole axis CHA. Although not by way of limitation, the other remaining ones of the ramps 22a of the remaining ones of the plurality of rib members 22 are oriented to rectilinearly align with the offset hole axis CHA along imaginary lines ILX as illustrated in FIG. 13. It is preferable that each one of the plurality of rib members 22 rectilinearly align with the offset hole axis CHA.

Figure 17:
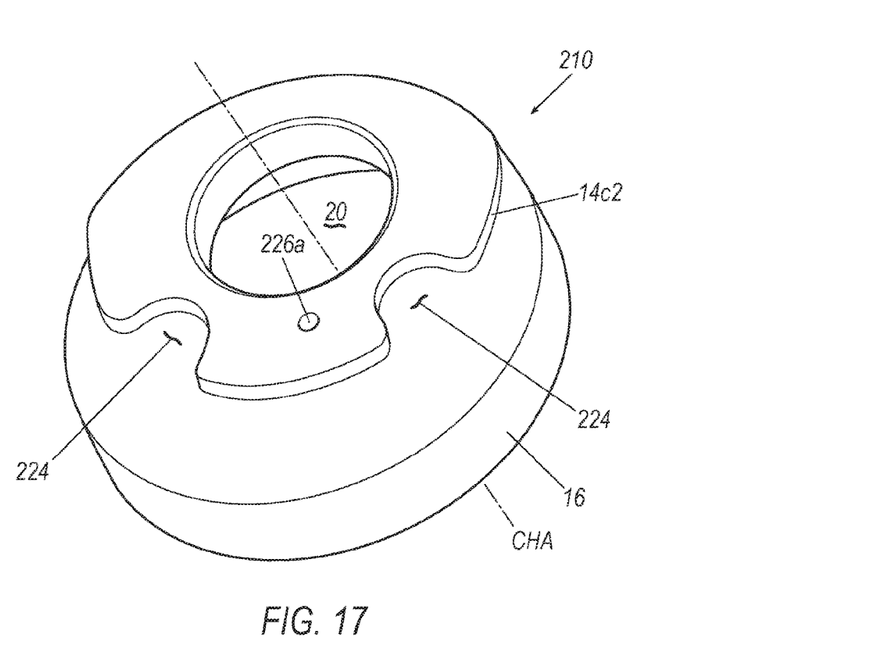
FIG. 17 is a front perspective view of a third exemplary embodiment of the reverse idler support article.
Figure 18:
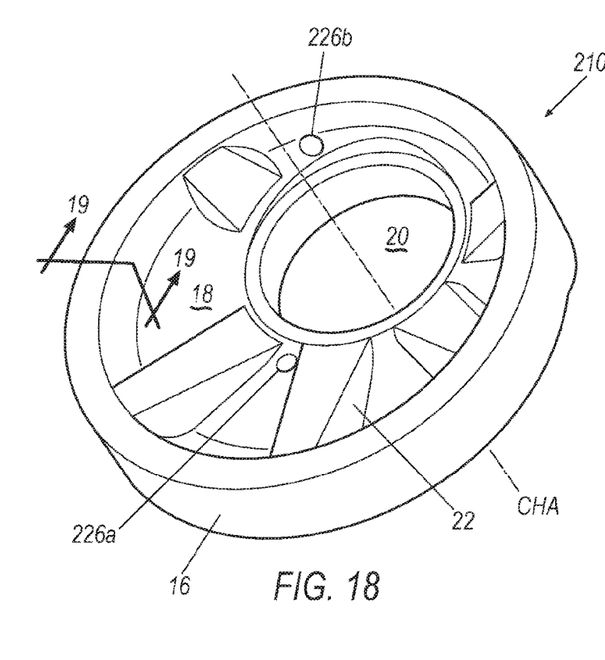
FIG. 18 is a rear perspective view of the third exemplary embodiment of the reverse idler support article.
Figure 19:
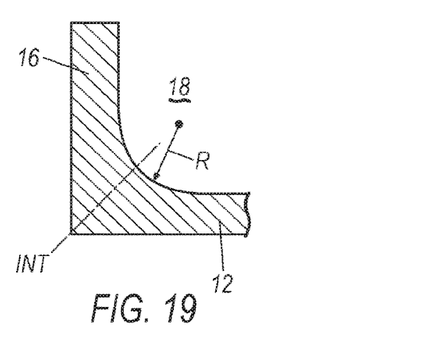
FIG. 19 is a partial cross-sectional view taken along lines 19-19 of the third exemplary embodiment of the reverse idler support article illustrated in FIG. 18.

A third exemplary embodiment of a reverse idler support article 210 of the present invention is illustrated in FIGS. 17-19. The third exemplary embodiment of the reverse idler support article 110 is formed as an integral construction using, for example, conventional machining techniques or conventional molding techniques. The third exemplary embodiment of the reverse idler support article 210 is similar to the first exemplary embodiment of the reverse idler support article 10 and the second exemplary embodiment of the reverse idler support article 110.

As shown in FIG. 17, the reverse idler support article 210 includes a pair of notches 224 angularly disposed apart from one another relative to the offset hole axis CHA along the second plateau peripheral end portion segment 14c2. Although not by way of limitation but by example only, the pair of notches 224 are configured similarly as notch 124a of the second embodiment of the invention. Also, the reverse idler support article 210 includes a first passageway 226a and a second passageway 226b (see FIG. 18), both of which being in a form of circular holes. The first passageway 226a extends through the disk member 12 and the plateau 14 and the second passageway 226b extends through the hollow cylinder 16. Both the first passageway 226a and the second passageway 226b provide fluid communication exteriorly of the reverse idler support article 210 and the interior space 18.

Additionally, as shown in FIG. 19, the hollow cylinder 16 and the disk member 12 connect to each other at an imaginary interface INT. In the interior space 18, the connection to and between the hollow cylinder 16 and the disk member 12 on both sides of the imaginary interface INT is curved at a radius R. It should be appreciated that this curved connection may be fortified by the addition of the base material used to fabricate the reverse idler support article 210. As a result of this curved connection, strength of the reverse idler support article 210 may be enhanced particularly at and on both sides of the imaginary interface INT.

Figure 20:
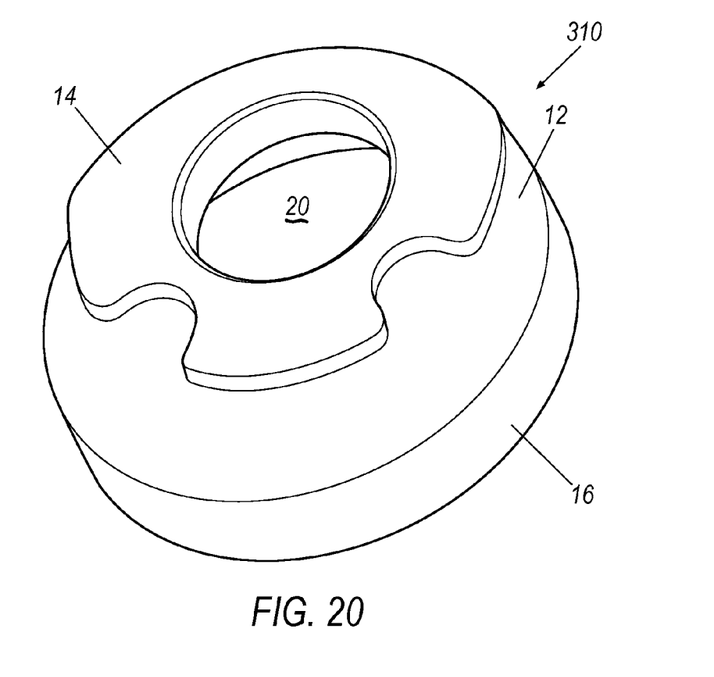
FIG. 20 is a front perspective view of a fourth exemplary embodiment of the reverse idler support article.
Figure 21:
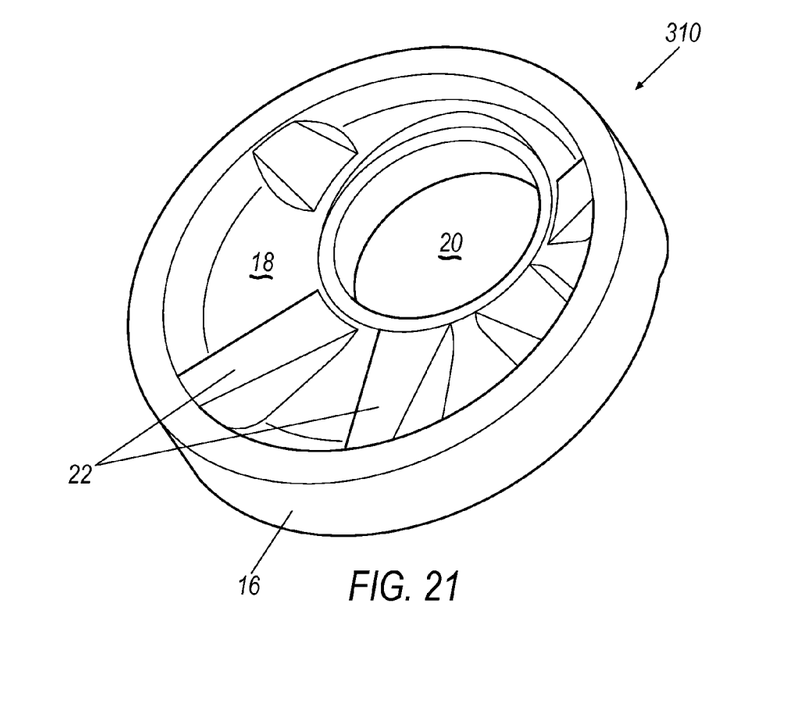
FIG. 21 is a rear perspective view of the fourth exemplary embodiment of the reverse idler support article.

A fourth exemplary embodiment of a reverse idler support article 310 of the present invention is illustrated in FIGS. 20 and 21. The fourth exemplary embodiment of the reverse idler support article 310 is similar to the third exemplary embodiment of the reverse idler support article 210 except that the fourth exemplary embodiment of the reverse idler support article 310 is devoid of passageways.

Figure 22:
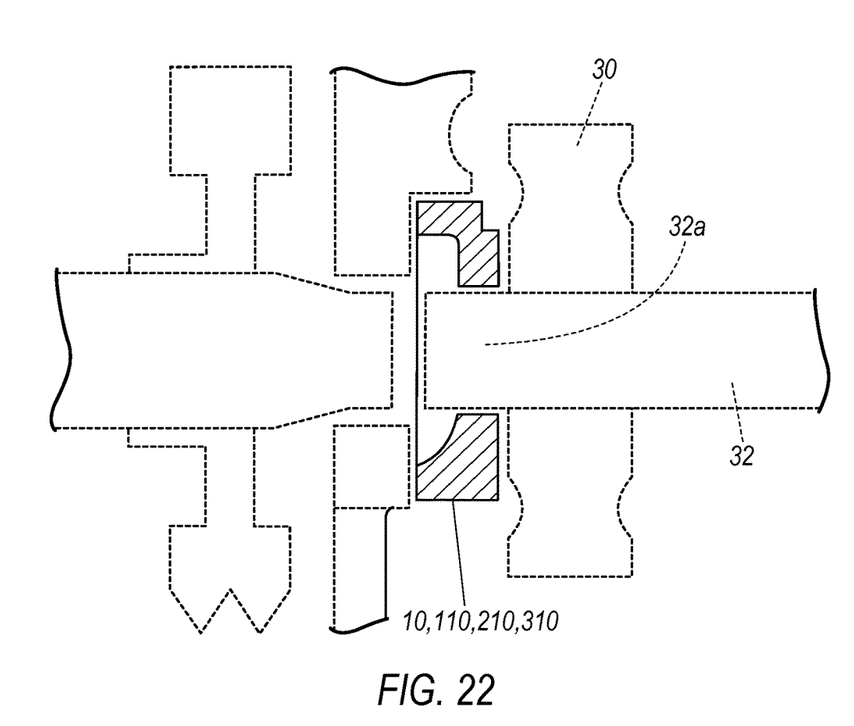
FIG. 22 is a cross-sectional view of the reverse idler support article employed with a conventional reverse idler gear assembly having a reverse idler shaft with a reverse idler gear rotatably mounted thereon.
Figure 23:
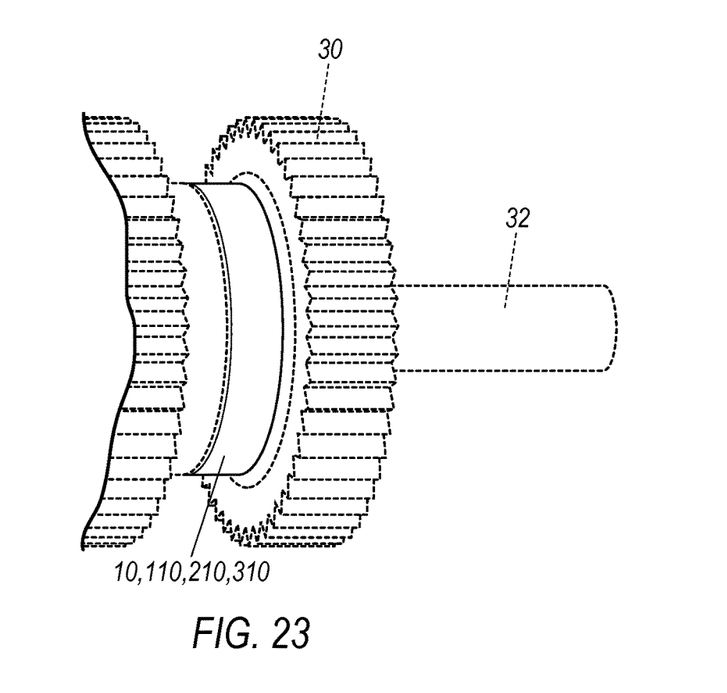
FIG. 23 is a perspective view of the reverse idler support article employed with a conventional reverse idler gear assembly shown in FIG. 22.

FIGS. 22 and 23 illustrate the reverse idler support article as it may be used in practice in conjunction with a conventional reverse idler gear assembly. A conventional reverse idler gear 30 is rotatably mounted onto a conventional reverse idler shaft 32. An end portion 32a of the reverse idler shaft 32 is supported by the reverse idler support article 10, 110, 210 and/or 310 of the present invention within a transmission casing (not shown).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. It is anticipated and intended that future developments will occur in the arts discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A reverse idler support article, comprising:
   a reverse idler support body including a disk member, a plateau and a hollow body, the disk member connected to and in facial contact with the plateau projecting from a first disk member surface thereof and the hollow body projecting from a second disk member surface thereof to define an interior space, the disk member and the plateau having an offset hole formed therethrough and in communication with the interior space, the offset hole oriented offset from a central axis extending generally centrally through the disk member and the interior space of the hollow body; and
   at least one passageway extending at least through the disk member, separate from the offset hole, for fluid communication exteriorly of the reverse idler support article and the interior space.

2. A reverse idler support article according to claim 1, further comprising at least one rib member disposed in the interior space and connected to the disk member and the hollow body.

3. A reverse idler support article according to claim 2, wherein the at least one rib member is shaped to form a ramp extending to and between the disk member and the hollow body.

4. A reverse idler support article according to claim 3, wherein the ramp of the at least one rib member is oriented within the interior space to rectilinearly align with the central axis and the offset hole.

5. A reverse idler support article according to claim 1, further comprising a plurality of rib members disposed in the interior space, each one of the plurality of rib members being connected to the second disk member surface and the hollow body.

6. A reverse idler support article according to claim 5, wherein, each one of the plurality of rib members is triangularly shaped to form a ramp extending to and between the disk member and the hollow body.

7. A reverse idler support article according to claim 6, wherein a respective ramp of one of the plurality of rib members is oriented within the interior space to rectilinearly align with the central axis and the offset hole and respective remaining ones of the ramps of the remaining ones of the plurality of rib members are oriented to rectilinearly align with the offset hole.

8. A reverse idler support article according to claim 1, wherein the at least one passageway extending at least through the disk member also extends through the plateau.

9. A reverse idler support article, comprising:
a disk member extending radially from and about a central axis and terminating in a disk member peripheral end portion, the disk member having a flat first disk member surface and a flat second disk member surface disposed opposite the first disk member surface and extending parallel thereto and a disk member hole extending through and between the first disk member surface and the second disk member surface and positioned offset from the central axis, the disk member hole having a disk member hole diameter;
a plateau having a flat first plateau surface and a flat second plateau surface disposed opposite the first plateau surface and extending parallel thereto, the plateau including a plateau hole having a plateau diameter and extending through and between the first plateau surface and the second plateau surface, the plateau diameter and the disk member hole diameter being equal to each other, the plateau connected to the first disk member surface in a manner that the first disk member surface and the first plateau surface are in facial contact with each other and the disk member hole and the plateau hole are axially aligned with one another to form an offset hole having a uniform diameter and extending along and about an offset hole axis;
a hollow cylinder connected to the second disk member surface at the disk member peripheral end portion and projecting therefrom, the hollow cylinder having an interior circumferential surface extending about the central axis to define an interior space with the second disk member surface, the interior space being in communication with the offset hole;
at least one passageway extending at least through the disk member, separate from the offset hole, for fluid communication exteriorly of the reverse idler support article and the interior space.

10. A reverse idler support article according to claim 9, further comprising at least one rib member disposed in the interior space and connected to the second disk member surface and the interior circumferential surface of the hollow cylinder.

11. A reverse idler support article according to claim 10, wherein the at least one rib member is triangularly shaped to form a ramp extending to and between the second disk member surface and the interior circumferential surface of the hollow cylinder.

12. A reverse idler support article according to claim 11, wherein the ramp of the at least one rib member is oriented within the interior space to rectilinearly align with the offset hole axis.

13. A reverse idler support article according to claim 9, further comprising a plurality of rib members disposed in the interior space, each one of the plurality of rib members being connected to the second disk member surface and the interior circumferential surface of the hollow cylinder and triangularly shaped to form a ramp extending to and between the second disk member surface and the interior circumferential surface of the hollow cylinder, one ramp of one of the plurality of rib members being oriented within the interior space to rectilinearly align with the offset hole axis and remaining ones of the ramps of the remaining ones of the plurality of rib members being oriented to rectilinearly align with the offset hole axis.

14. A reverse idler support article according to claim 9, wherein the offset hole axis and the central axis are disposed apart from and extend parallel to one another.

15. A reverse idler support article according to claim 9, wherein the disk member defines a disk member size and the plateau defines a plateau size being smaller than the disk member size.

16. A reverse idler support article according to claim 15, wherein the plateau includes a plateau peripheral end portion having a first plateau peripheral end portion segment and a second plateau peripheral end portion segment connected to each other to form a continuous loop, the first plateau peripheral end portion segment configured to coincide with a segment of the disk member peripheral end portion.

17. A reverse idler support article according to claim 16, wherein the offset hole is disposed between the central axis and the first plateau peripheral end portion segment.

18. A reverse idler support article according to claim 16, wherein the second plateau peripheral end portion segment includes at least one notch extending inwardly towards the offset hole axis.

19. A reverse idler support article according to claim 9, further comprising the first passageway extending at least through the disk member and a second passageway extending through the hollow cylinder for fluid communication exteriorly of the reverse idler support article and the interior space.

20. A reverse idler support article according to claim 9, wherein the at least one passageway extending at least through the disk member also extends through the plateau.

* * * * *